(12) United States Patent
DiLorenzo

(10) Patent No.: US 7,882,140 B1
(45) Date of Patent: Feb. 1, 2011

(54) SYSTEM AND METHOD FOR INSERTING SECONDARY CONTENT INTO PROGRAMMED PRIMARY CONTENT

(75) Inventor: Mark DiLorenzo, Laguna Beach, CA (US)

(73) Assignee: Hotel Digital Network Inc., Laguna Hills, CA (US)

( * ) Notice: Subject to any disclaimer, the term of this patent is extended or adjusted under 35 U.S.C. 154(b) by 148 days.

(21) Appl. No.: 11/004,280

(22) Filed: Dec. 3, 2004

(51) Int. Cl.
*G06F 7/00* (2006.01)
*G06F 17/30* (2006.01)

(52) U.S. Cl. ...................... 707/802; 707/803
(58) Field of Classification Search .............. 707/104.1, 707/802, 803, 999.102
See application file for complete search history.

(56) References Cited

U.S. PATENT DOCUMENTS

| | | | |
|---|---|---|---|
| 4,414,467 A | 11/1983 | Gould et al. | 235/381 |
| 4,528,643 A | 7/1985 | Freeny, Jr. | 705/52 |
| 4,553,211 A | 11/1985 | Kawasaki et al. | 700/236 |
| 4,905,280 A | 2/1990 | Wiedemer | 463/40 |
| 5,150,817 A | 9/1992 | Livingston | 221/81 |
| 5,219,094 A | 6/1993 | Labriola | 221/76 |
| 5,339,250 A | 8/1994 | Durbin | 700/237 |
| 5,355,302 A | 10/1994 | Martin et al. | 700/234 |
| 9,415,319 | 5/1995 | Risolia | 221/3 |
| 5,440,336 A | 8/1995 | Buhro et al. | 728/93 |
| 5,445,295 A | 8/1995 | Brown | 719/310 |
| 5,519,435 A | 5/1996 | Anderson | 725/92 |
| 5,521,631 A | 5/1996 | Budlow et al. | 725/78 |
| 5,528,282 A | 6/1996 | Voeten et al. | 725/92 |
| 5,629,867 A | 5/1997 | Goldman | 381/77 |
| 5,633,839 A | 5/1997 | Alexander et al. | 700/234 |
| 5,641,319 A | 6/1997 | Stoel et al. | 463/42 |
| 5,647,505 A | 7/1997 | Scott | 221/2 |
| 5,661,517 A | 8/1997 | Budow et al. | 725/60 |
| 5,734,719 A | 3/1998 | Tsevdos et al. | 700/234 |
| 5,748,485 A | 5/1998 | Christiansen et al. | 700/234 |
| 5,769,269 A | 6/1998 | Peters | 221/7 |
| 5,781,889 A | 7/1998 | Martin et al. | 705/1 |
| 5,794,217 A | 8/1998 | Allen | 705/27 |
| 5,798,785 A | 8/1998 | Hendricks et al. | 725/46 |
| 5,809,246 A | 9/1998 | Goldman | 709/217 |
| 5,831,862 A | 11/1998 | Hetrick et al. | 700/232 |

(Continued)

OTHER PUBLICATIONS

Logan et al., "Content-Based Playlist Generation: Exploratory Experiments", CiteseerX, 2002, pp. 1-2, download: http://citeseerx.ist.psu.edu/viewdoc/summary?doi=10.1.1.14.3320.*

(Continued)

*Primary Examiner*—Shahid A Alam
*Assistant Examiner*—Hares Jami
(74) *Attorney, Agent, or Firm*—Koppel, Patrick, Heybl & Dawson

(57) ABSTRACT

A system for inserting secondary content into programmed primary content includes a first database storing a number of primary content, a second database storing a number of secondary content and a server in communication with the first and second databases. The server is programmed to receive primary content distribution requests and associate the primary content distribution requests with one of a plurality of programmed play lists. The server is also programmed to execute secondary content insertion instructions including secondary content selection instructions and frequency of secondary content distribution instructions to generate an integrated play list comprising the primary content associated with the programmed play list and the secondary content.

10 Claims, 8 Drawing Sheets

U.S. PATENT DOCUMENTS

| | | | |
|---|---|---|---|
| 5,848,398 A | 12/1998 | Martin et al. | 705/14 |
| 5,890,910 A | 4/1999 | Tsurumi et al. | 434/307 A |
| 5,945,987 A | 8/1999 | Dunn | 715/718 |
| 5,947,746 A | 9/1999 | Tsai | 434/307 A |
| 5,953,005 A | 9/1999 | Liu | 345/202 |
| 5,959,945 A | 9/1999 | Kleiman | 381/81 |
| 6,067,562 A | 5/2000 | Goldman | 709/26 |
| 6,069,310 A | 5/2000 | James | 84/645 |
| 6,163,795 A | 12/2000 | Kikinis | 709/203 |
| 6,232,539 B1 | 5/2001 | Looney et al. | 84/609 |
| 6,248,946 B1 | 6/2001 | Dwek | 84/609 |
| 6,256,554 B1 | 7/2001 | DiLorenzo | 700/236 |
| 6,269,394 B1 | 7/2001 | Kenner et al. | 330/252 |
| 6,295,555 B1 | 9/2001 | Goldman | 709/219 |
| 6,392,664 B1 | 5/2002 | White et al. | 345/717 |
| 6,438,150 B1 | 8/2002 | Yoo | 700/236 |
| 6,628,302 B2 | 9/2003 | White et al. | 345/717 |
| 6,650,963 B2 | 11/2003 | DiLorenzo | 700/234 |
| 6,987,221 B2 * | 1/2006 | Platt | 84/601 |
| 7,020,710 B2 * | 3/2006 | Weber et al. | 709/232 |
| 7,047,242 B1 * | 5/2006 | Ponte | 707/10 |
| 7,174,309 B2 * | 2/2007 | Niwa | 705/26 |
| 2002/0038295 A1 * | 3/2002 | Navoni et al. | 707/1 |
| 2003/0105678 A1 * | 6/2003 | Bratton | 705/26 |
| 2004/0019497 A1 * | 1/2004 | Volk et al. | 705/1 |
| 2004/0243482 A1 * | 12/2004 | Laut | 705/27 |
| 2006/0080167 A1 * | 4/2006 | Chen et al. | 705/14 |

OTHER PUBLICATIONS

U.S. Appl. No. 10/462,232, filed Jun. 16, 2003.

* cited by examiner

SYSTEM AND METHOD FOR INSERTING SECONDARY CONTENT INTO PROGRAMMED PRIMARY CONTENT

BACKGROUND OF THE INVENTION

The invention relates generally to systems, methods and associated software for inserting secondary content, e.g., advertisement and/or promotional material, into programmed primary content, e.g., music and/or video. Primary content and secondary content as used within the context of this disclosure refer to electronic media including audio and/or video data stored in electronic format.

SUMMARY OF THE INVENTION

Briefly, and in general terms, the invention is directed to systems and methods for inserting secondary content into programmed primary content. One such system includes a first database storing a number of primary content, a second database storing a number of secondary content and a server in communication with the first and second databases. The server is programmed to receive primary content distribution requests and associate the primary content distribution requests with one of a number of programmed play lists. The server is also programmed to execute secondary content insertion instructions including secondary content selection instructions and frequency of secondary content distribution instructions to generate an integrated play list that includes the primary content associated with the programmed play list and the secondary content.

These and other aspects and advantages of the invention will become apparent from the following detailed description and the accompanying drawings which illustrate by way of example the features of the invention.

DETAILED DESCRIPTION OF THE PREFERRED EMBODIMENTS

Figure 1:
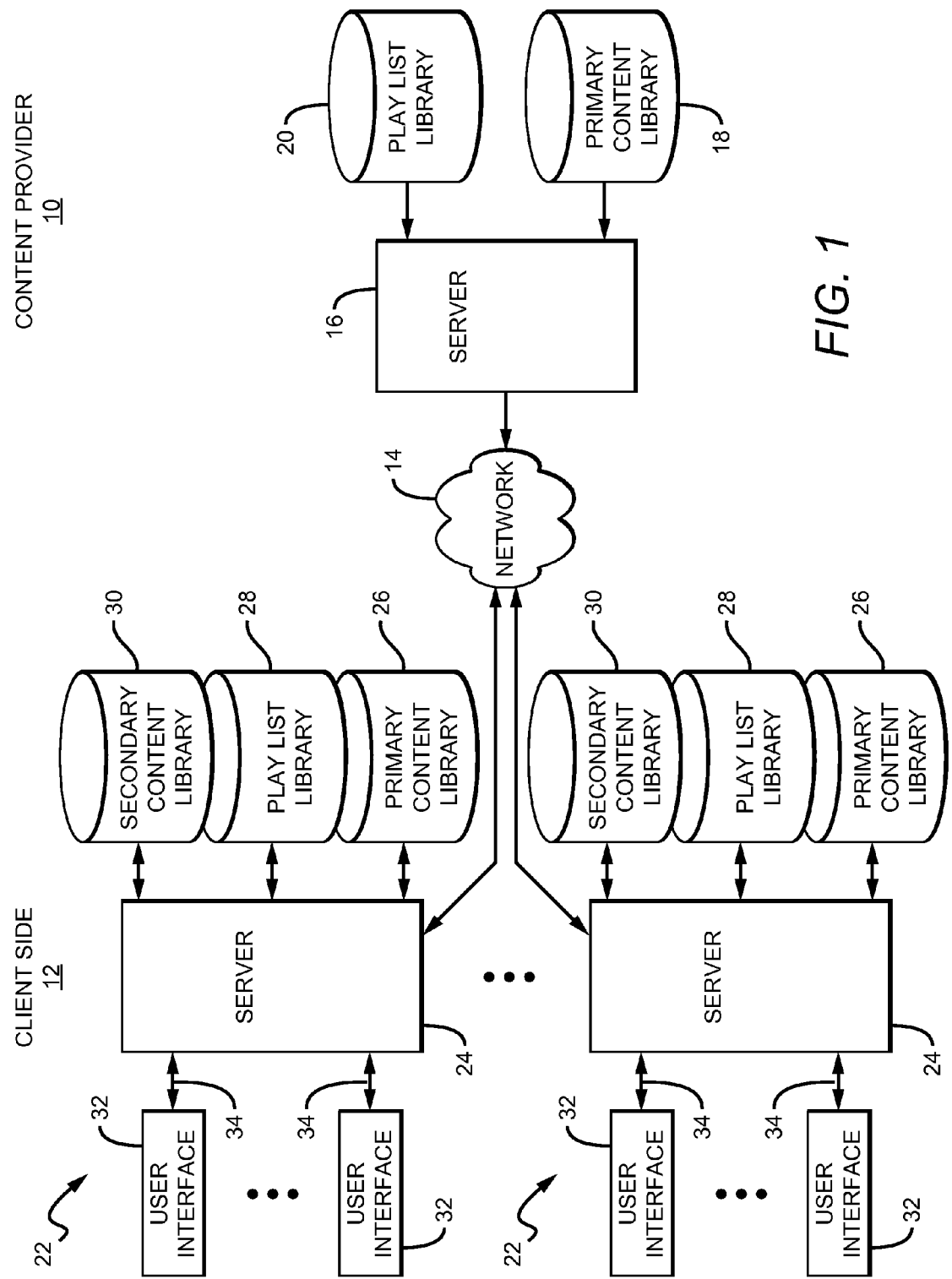
FIG. 1 is a block diagram of a media distribution system in accordance with the invention including a client provider side having a server, a primary content library and a play list library and a client side having a plurality of client systems, each with a server, a primary content library, a secondary content library, a play list library and a plurality of user interface systems.

Referring now to the drawings and particularly to FIG. 1, there is shown an electronic media distribution system having a content provider side 10 and a client side 12 interfacing through a communication network 14. The communications network 14 may be any type of network capable of transmitting electronic digital media. Examples of communications networks include the Internet, cable TV systems, satellite systems and RF coax systems, such as those used in the hospitality industry and described in U.S. Pat. Nos. 6,256,554 and 6,438,450, the disclosures of which are hereby incorporated by reference.

In one configuration of the system, the content provider 10 includes a content provider server 16, such as a Linux server, a primary content library 18 and a play list library 20. The primary content library 18 stores individual audio and/or image, e.g., still image and video, media-data files in a standard downloadable or streaming format, such as MP3 or MPEG-2. The primary content media-data files are also referred to as "entertainment content" and may include songs and music videos. Each of these primary content files has an associated identification code. The play list library 20 stores numerous files, each defining a play list. The play list files include a sequential list of identification codes for primary content files. For example, a play list file for a particular compact disc would include the identification codes for each of the songs on the compact disc, in the order as they appear on the compact disc. A play list file for a particular music channel, e.g., rock, country, classical, etc., would include the identification codes for numerous songs in the order the songs are to be played.

The client side 12 includes a plurality of client systems 22 located remote from the content provider server 16. In one implementation of the system one or more client systems are located in hotels within a hospitality network. Each client system 22 includes a server 24, a primary content library 26, a play list library 28 and a secondary content library 30. The primary content library 26 and the play list library 28 on the client side include the same files as the primary content library 18 and the play list library 20 on the content provider side and are updated over the network 14 through periodic files transfers from the content provider server 16.

The secondary content library 30 stores individual audio and/or image, e.g., still image and video, media-data files in a standard downloadable or streaming format, such as MP3 or MPEG-2. The media-data files in the secondary content library are referred to as "advertisement content" and may include audio and video advertisement or promotional information. Like the primary content files, each of the secondary content files has an associated identification code.

The client server 24 includes a processor capable of launching one or more audio and/or video players and one or more Internet browsers. Each client system 22 also includes several audio/video outputs which interface with a plurality of user interfaces 32 through appropriate communications lines 34. Such communications lines 34 may include category twisted-pair wires, coax cable and other such lines capable of transmitting digital electronic media. In a preferred configuration, the user interfaces 32 include a video monitor, remote control, speakers and an interface device, such as a TV remote control or a computer keyboard.

Operation of the client system 22 is controlled by system software within the client server 24. The system software provides a graphical user interface (GUI) between system users and the system 22. The system software also controls the selection and integration of content from the primary content library 26 and the secondary content library 30 and the distribution of content to the user interfaces 22. "Distribution" as used herein includes the playing of the content, such as through content downloading or streaming. In one embodiment of the system, content is transmitted by downloading a copy of the content to the user interface 32. In another embodiment of the system, content is transmitted by streaming the content to the user interface 22.

Figure 2:
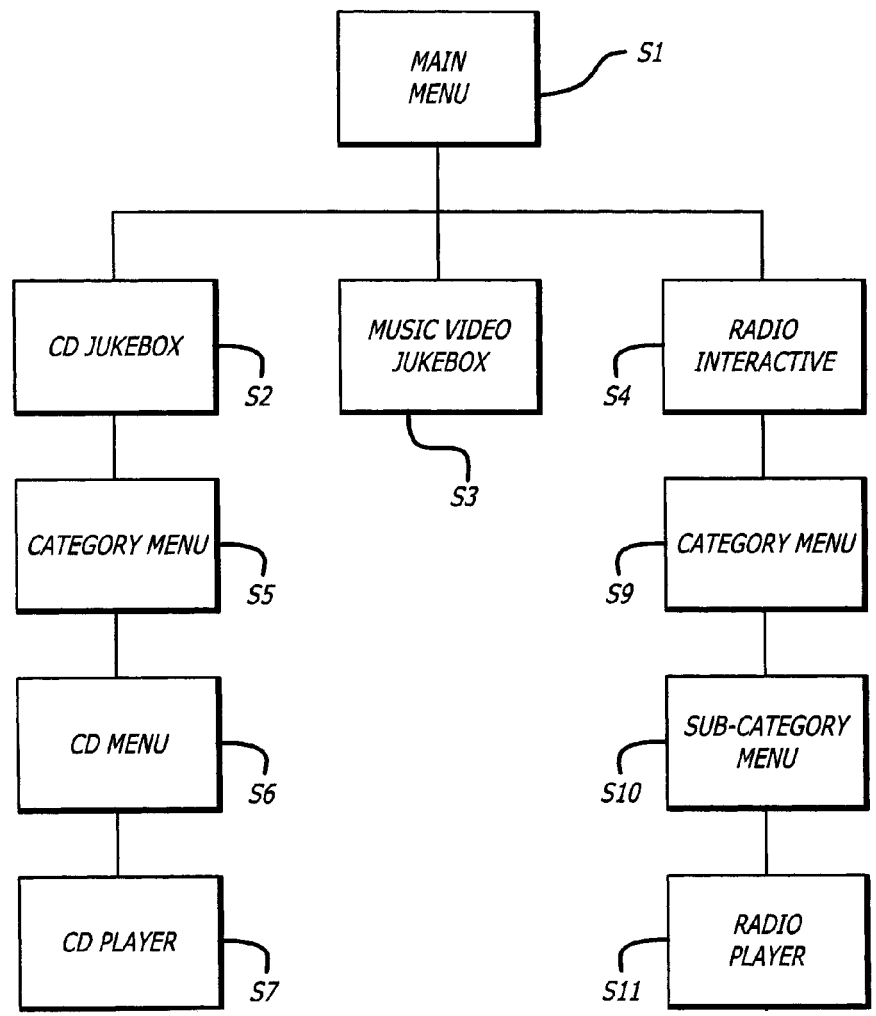
FIG. 2 is a flow chart of various modes of operation of one configuration of the system including CD Jukebox, Music Video Jukebox and Radio Interactive.
Figure 3:
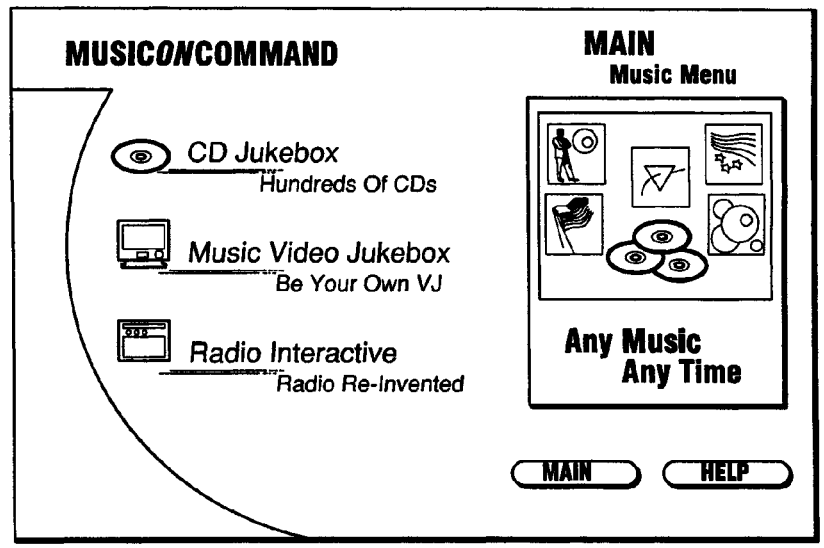
FIG. 3 is an exemplary main menu provided by the client server to the user interface through which a user may select a mode of operation.

With reference to FIG. 2, operation of the system is as follows. At step S1, the client server 24 presents a main activation menu screen (FIG. 3) to the user interface 32, through which a user may access the system. Once the user accesses the system, the system software presents a series of selection menus through which the user may select content for playing. In one embodiment of the system, there are three aspects of the system which may be accessed by the user. These aspects include CD Jukebox S2, Music Video On Demand S3 and Radio Interactive S4.

Figure 4:
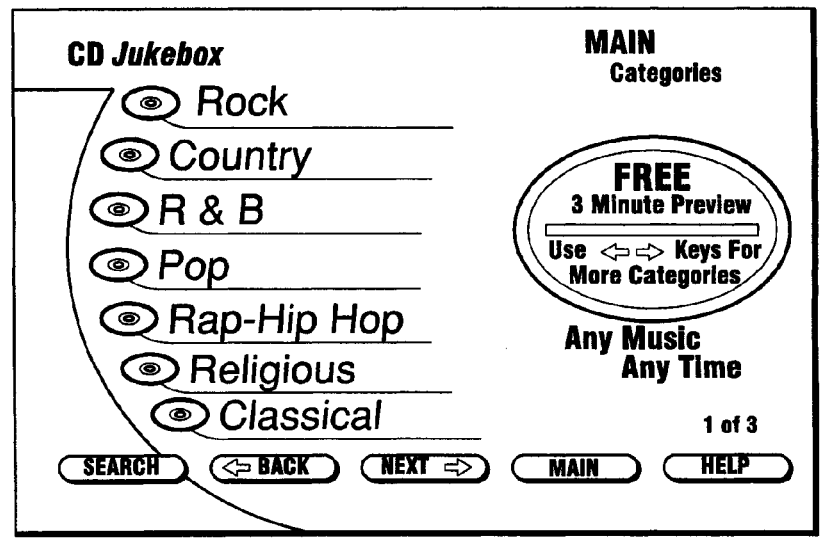
FIG. 4 is an exemplary category menu provided by the client server to the user interface upon selection of the CD Jukebox mode provided by the menu of FIG. 3.
Figure 5:
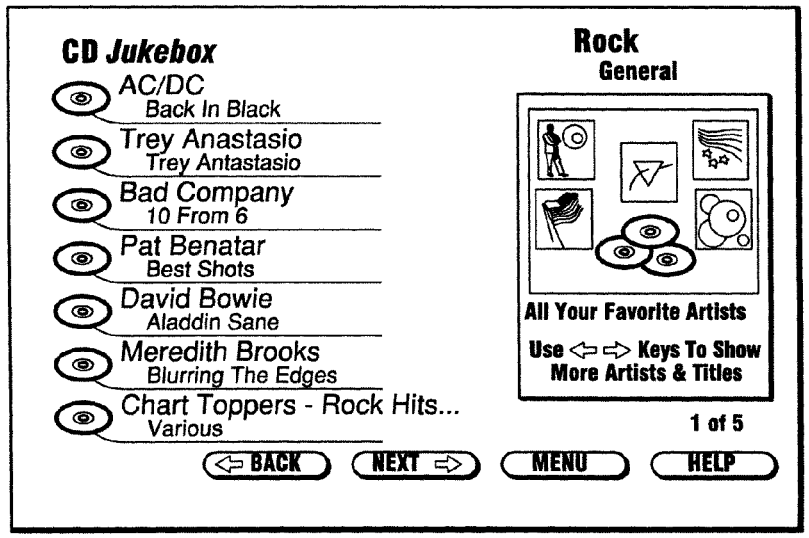
FIG. 5 is an exemplary CD menu provided by the client server to the user interface upon selection of a category from the menu of FIG. 4.
Figure 6:
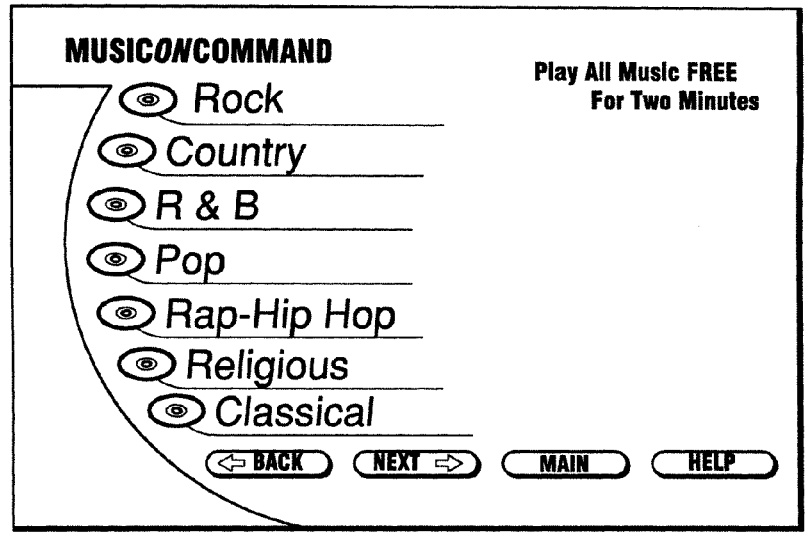
FIG. 6 is an exemplary category menu provided by the client server to the user interface upon selection of the Radio Interactive mode provided by the main menu of FIG. 3.
Figure 7:
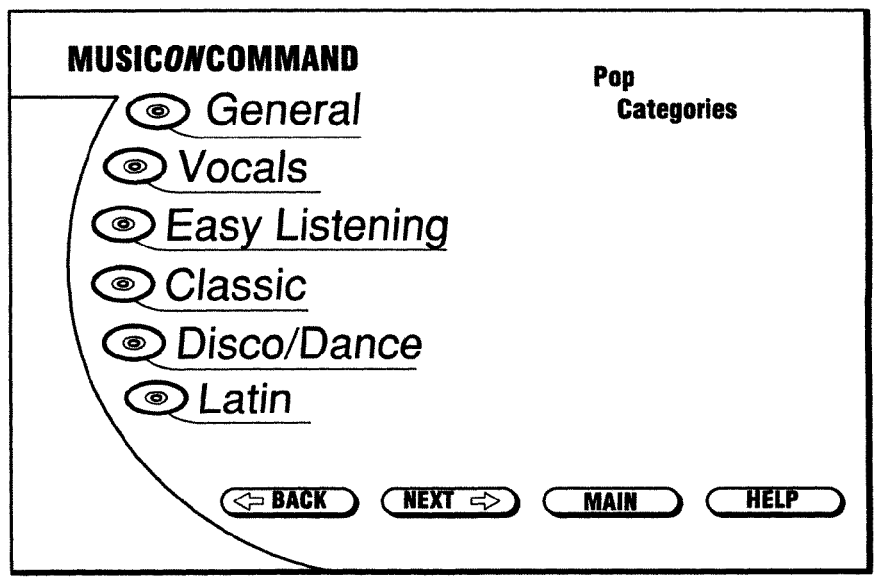
FIG. 7 is an exemplary sub-category menu provided by the client server to the user interface upon selection of a category from the menu of FIG. 6.

With continued reference to FIG. 2, if the user selects the CD Jukebox option, the system software sends a category menu screen (FIG. 4), to the user interface 22. At step S5, the user may select one of the categories presented. The system then sends a CD menu screen (FIG. 5) to the user interface 22. At step S6, the user may then select a CD. With continued reference to FIG. 2, if a user enters the Radio Interactive aspect of the system, the system software sends a category menu screen (FIG. 6) to the user interface 22. At step S9, the user may select one of the categories presented. Upon selection of a category, the system software sends a sub-category menu screen (FIG. 7) to the user interface. At step S10, the user may then select a style of music. A selection of a CD or a category of radio station by a user serves as a request from the user to the client server to distribute the primary content associated with the request.

Each CD or category of radio station has an associated play list which identifies a list of primary content. The pieces of primary content included in the play list are generally distributed in the order they appear on the play list. In accordance with the invention, however, secondary content in the form of advertisements or promotional materials, may be integrated into the programmed play list, for example, at the point of distribution of the programmed play list, e.g., at the client system 22. Software located in the client server 24 controls the integration process.

Depending on the CD or radio station selected, the client server 24 obtains the play list associated with the selected CD or radio station from the play list library 28 and executes a content integration function with respect to the obtained play list. In general, a content integration function has associated rules which when followed or executed by the server 24, results in the integration of secondary content from the secondary content library 30 into the obtained programmed primary content play list.

In one example of a content integration function, the client server 24 has preprogrammed secondary content integration rules or parameters stored in memory. These parameters define how often a piece of secondary content is to be inserted into a play list of primary content, or in other words, the frequency of secondary content insertion. As explained further below the frequency parameters may be number based or time based.

Figure 8:
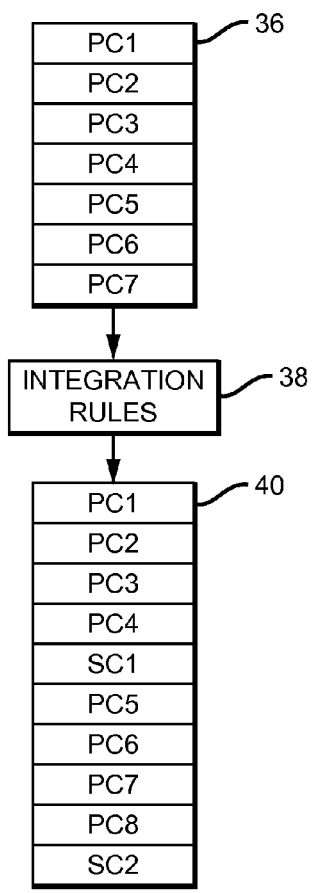
FIG. 8 is a general process diagram of the integration of secondary content with primary content into an integrated play list.

With reference to FIG. 8, upon selection of a CD, the system software causes the client server 24 to obtain the selected CD's play list 36 from the play list library 28. This play list is referred to as a "primary play list" and includes the identification codes of a number of primary content (PCn). The system software also causes the client server 24 to search its memory for content integration rules 38. If content integration rules 38 are located, the system software causes the server 24 to apply the rules to the primary play list 36 to generate a play list 40 having the identification codes of secondary content (SCn) inserted therein. This new play list is referred to as an "integrated play list."

Once an integrated play list 40 is generated, the client server 24 executes the play list by accessing the appropriate pieces of primary content from the primary content library 26 and transmitting the content to the user interface 22. At the appropriate point in the play list, the client server 24 accesses a piece of secondary content from the secondary content library 30 and transmits it to the user interface 22. Once that transmission is complete, the client server 24 access the next piece of primary content on the play list and transmits it. The process of playing primary content and secondary content continues until the playing of the integrated play list 40 is complete or until play is discontinued by the user.

Figure 9:
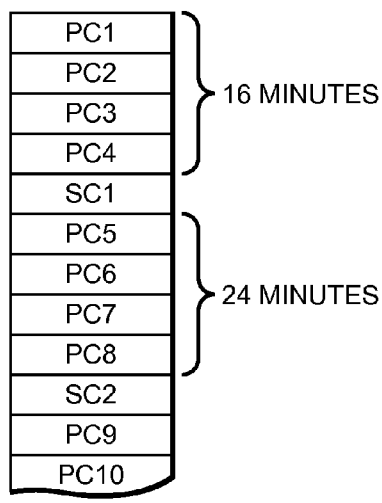
FIG. 9 is an example of an integrated play list resulting from a number based integration rule.

As previously mention, the integration rules may define the frequency of secondary content playing in terms of number or time. A number based frequency requires that a piece of secondary content be played after every x number of pieces of primary content are played. In this configuration, the playing of secondary content may not be equally spaced due to variations in the duration of the pieces of primary content. For example, with reference to FIG. 9, assuming a number frequency of four, i.e., a secondary content is played after every fourth piece of primary content, each of PC1-PC4 has a duration of 4 minutes and each of PC5-PC8 has a duration of 6 minutes, the first piece of secondary content will be played at the 16 minute point while the second piece of secondary content will be played 24 minutes after the first piece of secondary content.

Figure 10:
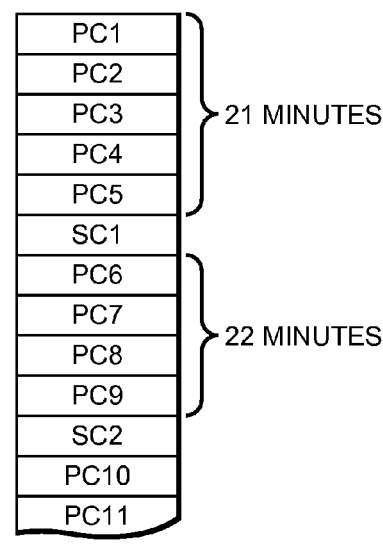
FIG. 10 an example of an integrated play list resulting from a time based integration rule.

In order to allow for a more even spacing of secondary content playing, the integration rules may be time based. In this configuration, the primary play list includes a duration code for each piece of primary content in the list. Using these duration codes, the system software inserts pieces of secondary content in the integrated play list after the piece of content nearest the required time interval. For example, with reference to FIG. 10, assuming a time interval of 20 minutes and PC1-PC10 durations of 3, 5, 4, 5, 4, 5, 7, 3, 7, 4 minutes respectively, the first piece of secondary content would be inserted after PC5 (21 minutes after the start of playing) and the second piece of primary content would be inserted after PC9 (22 minutes after the playing of the first piece of secondary content). While simple whole minute durations have been used in this example, the duration codes for the primary content will of course include seconds and possibly tenths of second measurements and the system will account for these.

The integration rules may also be programmed to insert secondary content at the time closest to the required interval, even if the time is less than the required time interval. For example, if the duration of primary content is such that a piece of secondary content may be inserted after four pieces of primary content at the 19 minute mark or after five pieces of primary content at the 24 minute mark, the system would insert the secondary content at the position closer to the defined time, which in this example is the 19 minute mark.

Although the foregoing description refers to the generation of an integrated play list prior to playing, it is understood that the system may be configured to perform this function "on the fly." In such a configuration, the system may begin to play the primary content of a primary play list and periodically pause primary content playing in order to play a piece of secondary content. For example, if the integration rules require the insertion of a piece of secondary content after every fifth piece of primary content, the client server 24 would perform this function on the fly through the use of a counter function, with the counter incrementing one value for each piece of primary content played. Once the prescribed counter value is met, primary content play would pause, the piece of secondary content would be played and the counter would reset to zero. Likewise, if the integration rules require the insertion of secondary content every 20 minutes, the client server 24 would perform this function on the fly through the use of a timer function. with primary content play pausing after completion of the piece of primary content that is being played when the timer reaches 20 minutes.

Figure 11:
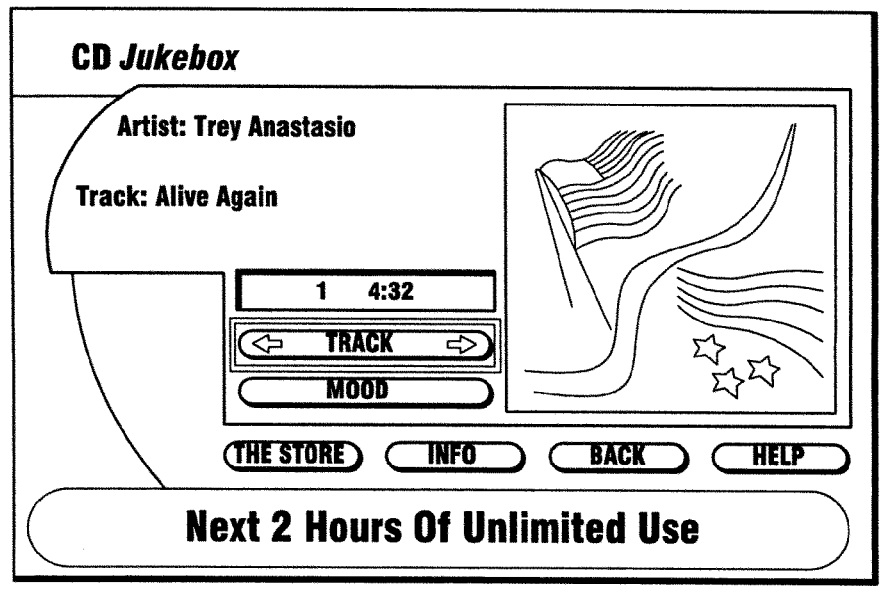
FIG. 11 is an exemplary CD player made available to the user interface upon selection of a CD from the menu of FIG. 5.
Figure 12:
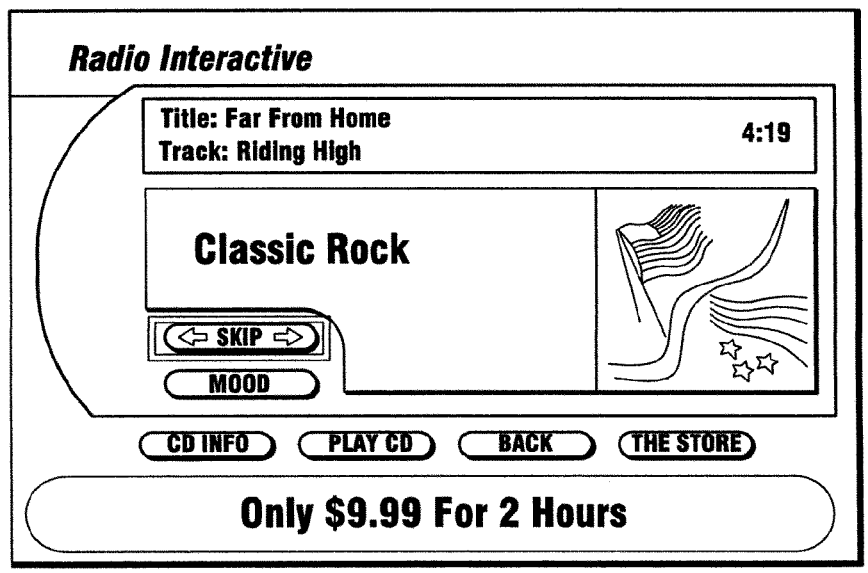
FIG. 12 is an exemplary player made available to the user interface upon selection of a sub-category from the menu of FIG. 7.

Returning to FIG. 2, at step S7 or step S11, the user is presented with a CD player menu (FIG. 11) or a Radio Interactive player menu (FIG. 12). Using the player menu, the user may select a particular piece of primary content, i.e., a track associated with the CD or the programmed radio station, to play using the track up and track down or skip user interfaces. In this case, the programmed play list order is bypassed in favor of the user's selection. However, in order to prevent the user from bypassing secondary content, the pieces of secondary content may include a bypass-prevention code, which overrides the functionality of the player menu during secondary content play.

In view of the player menu and the user's ability to bypass the playing of pieces of primary content through the player menu, the pieces of secondary content may be played sooner than required by the integration rules. For example, if a time-based integrated play list prescribes the playing of five, four-minute pieces of primary content and then the playing of a piece of secondary content at the twenty minute mark, and the user, through the player menu, skips pieces two and three of the primary content, the first piece of secondary content would end up being played only after twelve minutes of primary content playing. This, in combination with the bypass-prevention code included in secondary content, may result in a user becoming frustrated when he essentially skips over primary content playing and forwards to a piece of secondary content which he cannot bypass.

The previously described, "on the fly" configuration of the system may be further configured to avoid this condition. More specifically, if the integration rules are frequency number based, the system's counter function may be programmed to only count a piece of primary content as being played, if it is actually played for a specified time duration, which may be expressed as a specific time (e.g., one minute) or a percentage of total time (50% of the total time duration of the piece).

Figure 13:
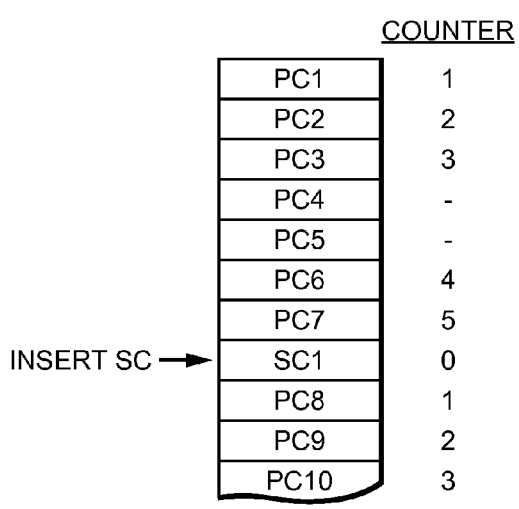
FIG. 13 is an example of an integrated play list formed "on the fly" by a client server using a number based integration rule and a counter.

For example, with reference to FIG. 13, if the integration rules require insertion of a piece of secondary content after every fifth piece of primary content and a piece of content counts as being played if it is actually played for at least one minute and the user, through the player menu, plays the first three pieces of content for their entire duration, each of the fourth and fifth pieces of content for only ten seconds and the sixth and seventh pieces of content for their entirety, then the first piece of secondary content would be integrated into the play list after the seventh piece of content, with the counter resetting at that point.

Figure 14:
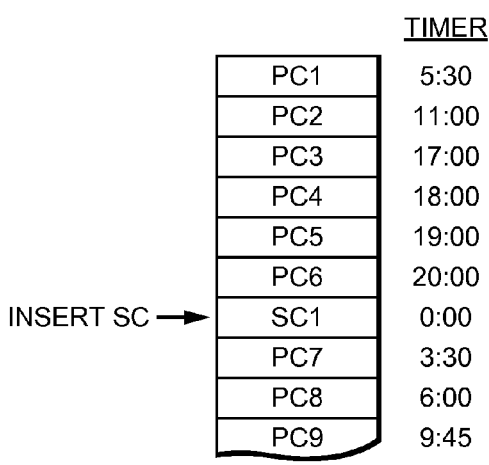
FIG. 14 is an example of an integrated play list formed "on the fly" by a client server using a times based integration rule and a timer.

If the integration rules are frequency time based, then the system's timer function may be programmed to keep track of the accumulative amount of time that pieces of primary content are played, regardless of whether a piece is played entirely or only partially. Thus, with reference to FIG. 14, if a piece of secondary content is to be inserted every twenty minutes and a user plays the first three piece entirely for a total of seventeen minutes and then plays the next three pieces only partially, for one minute each, the secondary piece of content would be inserted after the sixth piece of primary content, with the timer resetting at that point.

The secondary library 30 may include a number of secondary content for integration into a play list. As previously mention, these pieces of secondary content are generally in the form of advertisements and promotions. In order to generated revenue from the playing of these pieces of content, the client server 24 may keep track of the number of times a piece of secondary content is played and charge the entity associated with the advertisement or promotion a fee on a per play basis. This may be done by inserting a code at the end of the secondary content file, which when played by the server 24 increments a counter in the server.

As an additional means of generating revenue, each piece of secondary content may have an associated priority code. Those pieces of content with a higher priority code would be inserted into a play list more often then those with a lower priority code. For example, assuming a secondary library has five pieces of secondary content and two of them have a priority code of two and three of them have a priority code of one, the pieces of content having a priority code of two would be inserted into a play list twice as often as the pieces of content having a priority code of one. If all pieces of content have the same priority code, each would be inserted an equal number of times.

It is worth noting that because the generation of integrated play lists is based on user interactions with the system, the just described secondary content selection process is performed on a user interface 32 basis. Thus, the selection of pieces of secondary content for insertion in a play list being generated for one user interface 32 does not affect the selection of secondary content for another user interface. This ensures an even distribution of secondary content for each of the user interfaces 32.

Figure 15:
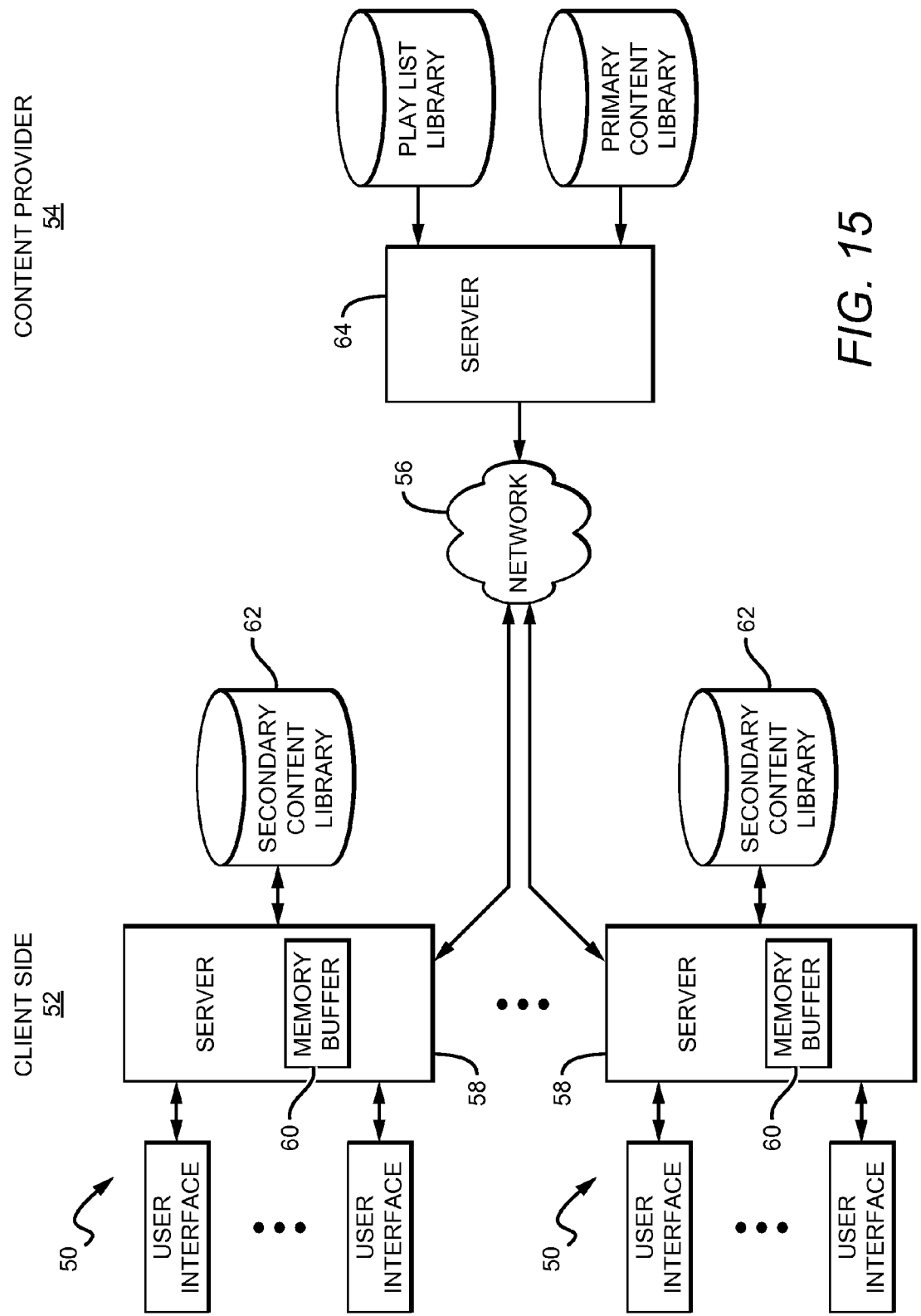
FIG. 15 is a block diagram of another media distribution system in accordance with the invention including a client provider side having a server, a primary content library and a play list library and a client side having a plurality of client systems, each with a server, a secondary content library and a plurality of user interface systems.

With reference to FIG. 15, in another embodiment of the system, the play list and content associated with the play list are located remote from the client systems 50. In response to user interaction on the client side 52, the content provider 54 distributes (by download or streaming) the content to the client server over the network 56 in play list order and the client server 58 executes integration rules with respect to the content, on the fly, as it is received. In this configuration the client server 58 includes a memory buffer 60 which is used to temporarily store content received from the content provider 54 in response to integration rules. The client server 58 also includes a secondary content library 62 from which secondary content are obtained for insertion into the play list.

The client server 58 receives the first piece of primary content from the content provider server 64 and executes the integration rules with respect to the piece of content. Specifically, if the integration rules are number based with a minimum play time constraint, the client server 58 monitors the playing of the piece of primary content for minimum play time requirements and increments a counter in the client server if the requirements are satisfied. The client server 58 does this for each piece of primary content received from the content provider.

Once the number requirement of the integration rules is met (e.g., five pieces of primary content are played) the client server 58 "pauses" the playing of the primary content received from the remote content provider 54 in order to play a piece of secondary content from the local secondary content library 62. The "pausing" of primary content playing is performed by the client server 58 in conjunction with the memory buffer 60 and does not impact the operation of the content provider 54. More specifically, while the piece of secondary content is being played, the client server 58 continues to receive primary content from the content provider 54 and places this content in the memory buffer 60. Once the piece of secondary content is finished being played, the client server 58 resumes playing of the primary content stored in the memory buffer 60 and continues to execute the integration rules with respect to the stored primary content. The client server 58 may be programmed to perform a similar operation for time based integration rules.

It will be apparent from the foregoing that, while particular forms of the invention have been illustrated and described, various modifications can be made without departing from the spirit and scope of the invention. Therefore, it is not intended that the invention be limited, except as by the appended claims.

What is claimed is:

1. An electronic media distribution system arranged to insert secondary content into programmed primary content, said system comprising:
    a first database storing a plurality of primary content files, each of which contains primary content and has an associated identification code;
    a second database storing a plurality of secondary content files, each of which contains secondary content and has an associated identification code, said second database being separate from said first database;
    a first play list library storing a plurality of programmed play lists, each of which contains a sequential list of identification codes for respective primary content files which defines the order in which said primary content files are to be distributed, said programmed play lists only containing identification codes for primary content files; and
    a common server directly connected to said first and second databases and to said play list library, the server programmed to:
        receive a primary content distribution request;
        associate the primary content distribution request with one of said programmed play lists; and
        execute instructions which selects secondary content files from said second database and defines the frequency with which said secondary content files are inserted into the programmed play list associated with said primary content distribution request such that an integrated play list is generated comprising the primary content files associated with the programmed play list and the secondary content files inserted in response to said instructions, said frequency with which said secondary content files are inserted into said programmed play list being time based, in which a fixed time interval is defined and secondary content files are inserted into the integrated play list such that when said play list is played, a piece of secondary content will be played each time said fixed time interval is completed, or number based, in which a fixed value x is defined and secondary content files are inserted into the integrated play list such that when said play list is played, a piece of secondary content will be played after every x number of pieces of primary content are played; and
    two or more user interfaces, each of which is separate and distinct from and directly connected to the common server with no intervening network, each of said user interfaces arranged to:
        display a main activation menu screen through which a user may access the electronic media distribution system;
        display a series of selection menus through which said user may select content to be played;
        generate commands indicating the content selected by said user; and
        display the selected content for said user;
    said server further programmed to:
        provide data to said user interfaces for generating said main activation menu;
        provide data to said user interfaces for generating said series of selection menus;
        and, for each user interface,
        play the primary and secondary content associated with the integrated play list for the user via the user interface in response to commands received from said user interface, beginning with the first content file on said integrated playlist.

2. The system of claim 1 wherein each of said primary content files includes a duration code and the server is further programmed to:
    identify each primary content file in the play list during which the accumulated time of the primary contents exceeds the defined time interval; and
    insert a selected secondary content file into said play list after each of said identified primary content files.

3. The system of claim 1 wherein the server includes a timer function and is further programmed to:
    accumulate the time of primary content as the primary content is being played;
    pause said playing of primary content upon completion of the primary content file being played when the timer exceeds said defined time interval;
    play a selected secondary content file; and
    resume said playing of primary content after the playing of said selected secondary content file is completed.

4. The system of claim 1 wherein the server is further programmed to:
    determine the position in the play list where the number of the primary content file exceeds said defined value x; and
    insert a selected secondary content file into said play list at the determined position.

5. The system of claim 1 wherein the server includes a counter function and is further programmed to:
   accumulate the number of primary content entries from said play list which have been played;
   pause said playing of primary content upon completion of the primary content file being played when the counter equals said defined value x;
   play a selected secondary content file; and
   resume said playing of primary content after the playing of said selected secondary content file is completed.

6. The system of claim 1 wherein the server includes a timer function and is further programmed to:
   accumulate the time of primary content as the primary content is being played, accounting for commands received from the player menu;
   pause said playing of primary content upon completion of the primary content file being played when the timer exceeds said defined time interval; and
   play a selected secondary content file.

7. The system of claim 1 wherein the server includes a counter function and is further programmed to:
   accumulate the number of primary content files played, accounting for commands received from the player menu;
   pause said playing of primary content upon completion of the primary content file being played when the counter equals said defined value x; and
   play a selected secondary content file.

8. The system of claim 1, further comprising a content provider, said content provider comprising:
   a primary content library which stores a plurality of primary content files;
   a second play list library which stores a plurality of programmed play lists, each of which contains a sequential list of identification codes for respective primary content files in said primary content library; and
   a communication network which couples said primary content library and said second play list library to said first database and said first play list library, respectively, said system arranged to periodically transfer files between said content provider and said first database and said first play list library via said communication network so that said primary content library and said first database contain the same primary content files and such that said second play list library and said first play list library contain the same programmed play lists.

9. The system of claim 1, wherein each of said user interfaces comprises:
   a video monitor;
   one or more speakers for reproducing sound associated with said selected content; and
   a remote control device for operating said user interface remotely.

10. An electronic media distribution system arranged to insert advertising content into entertainment content, said system comprising:
    a content provider side, comprising:
      a content provider side entertainment content library storing a plurality of entertainment content files;
      a content provider side play list library storing a plurality of programmed play lists, each of which contains a sequential list of identification codes for respective entertainment content files in said content provider side entertainment content library;
    a client side, comprising:
      a client side entertainment content library which stores a plurality of entertainment content files, each of which has an associated identification code;
      a client side play list library which stores a plurality of programmed play lists, each of which contains a sequential list of identification codes for respective entertainment content files in said client side entertainment content library, said programmed play lists containing only identification codes for entertainment content files;
      an advertising content library which stores a plurality of advertising content files, each of which has an associated identification code, said advertising content library being separate from said client side entertainment content library;
    a common server directly connected to said client side entertainment, advertising content, and play list libraries, the server programmed to:
      receive an entertainment content distribution request;
      associate the entertainment content distribution request with one of the programmed play lists in said client side play list library; and
      execute instructions which selects advertising content files from said client side advertising content database and defines the frequency with which said advertising content files are inserted into the programmed play list associated with said entertainment content distribution request such that an integrated play list is generated comprising the entertainment content files associated with the programmed play list and the advertising content files inserted in response to said instructions, said frequency with which said advertising content files are inserted into said programmed play list being time based, in which a fixed time interval is defined and advertising content files are inserted into the integrated play list such that when said play list is played, a piece of advertising content will be played each time said fixed time interval is completed, or number based, in which a fixed value x is defined and advertising content files are inserted into the integrated play list such that when said play list is played, a piece of advertising content will be played after every x number of pieces of entertainment content are played;
    two or more user interfaces, each of which is separate and distinct from and directly connected to the common server with no intervening network, each of said user interfaces arranged to:
      display a main activation menu screen through which a user may access the electronic media distribution system;
      display a series of selection menus through which said user may select content to be played;
      generate commands indicating the content selected by said user; and
      display the selected content for said user;
    said server further programmed to:
      provide data to said user interfaces for generating said main activation menu;
      provide data to said user interfaces for generating said series of selection menus;
      and, for each user interface,
      play the entertainment and advertising content associated with the integrated play list for the user via the user interface in response to commands received from said user interface, beginning with the first entertainment content file on said integrated playlist; and a communication network which couples said content provider side entertainment content library and play list library to said client side entertainment content library and play list library, respectively, said system arranged to periodically transfer files between said content provider side and said client side via said communication network so that said client side entertainment content library contains the same entertainment content files as said content provider side entertainment content library and so that said client side play list library contains the same programmed play lists as said content provider side play list library.

* * * * *